US012652196B2

(12) United States Patent
Tawa

(10) Patent No.: US 12,652,196 B2
(45) Date of Patent: Jun. 9, 2026

(54) WIRELESS COMMUNICATION DEVICE, SYSTEM, METHOD, AND NON-TRANSITORY COMPUTER-READABLE MEDIUM

(71) Applicant: NEC Corporation, Tokyo (JP)

(72) Inventor: Noriaki Tawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 338 days.

(21) Appl. No.: 18/579,928

(22) PCT Filed: Jan. 19, 2022

(86) PCT No.: PCT/JP2022/001862
§ 371 (c)(1),
(2) Date: Jan. 17, 2024

(87) PCT Pub. No.: WO2023/053472
PCT Pub. Date: Apr. 6, 2023

(65) Prior Publication Data
US 2024/0356781 A1 Oct. 24, 2024

(30) Foreign Application Priority Data

Sep. 30, 2021 (JP) ................................. 2021-160872

(51) Int. Cl.
*H04L 25/02* (2006.01)
*H04L 5/00* (2006.01)
(52) U.S. Cl.
CPC ........ *H04L 25/0228* (2013.01); *H04L 5/0023* (2013.01); *H04L 25/0212* (2013.01)

(58) Field of Classification Search
CPC . H04L 27/26; H04L 25/0212; H04L 25/0228; H04L 25/0224; H04L 5/0023; H04L 27/01; H04J 11/00
See application file for complete search history.

(56) References Cited

U.S. PATENT DOCUMENTS

| | | | |
|---|---|---|---|
| 9,671,817 B1 * | 6/2017 | Thielen ................ | H03K 23/502 |
| 10,917,210 B2 * | 2/2021 | Saito ..................... | H04L 5/0048 |

(Continued)

FOREIGN PATENT DOCUMENTS

| | | |
|---|---|---|
| JP | 2007-134783 A | 5/2007 |
| JP | 2020-205641 A | 12/2020 |
| JP | 2021-502783 A | 1/2021 |

OTHER PUBLICATIONS

International Search Report for PCT Application No. PCT/JP2022/001862, mailed on Mar. 1, 2022.

(Continued)

*Primary Examiner* — Syed Ali
(74) *Attorney, Agent, or Firm* — Sughrue Mion, PLLC

(57) ABSTRACT
To provide a wireless communication device, a system, a method, and a program capable of accurately demodulating an orthogonal time frequency space (OTFS) signal with a small amount of calculation while maintaining an OTFS signal of a high data rate. A wireless communication device according to the present disclosure includes a reception unit configured to perform channel estimation using a first reference signal, perform phase correction mainly using a second reference signal, and demodulate a received orthogonal time frequency space (OTFS) signal using results of the channel estimation and the phase correction.

11 Claims, 11 Drawing Sheets

(56)         References Cited

U.S. PATENT DOCUMENTS

| | | | |
|---|---|---|---|
| 11,337,864 B1 * | 5/2022 | Daneshvar | A61F 13/01034 |
| 11,646,913 B2 * | 5/2023 | Hadani | H04L 5/0023 |
| | | | 370/252 |
| 2008/0123757 A1 | 5/2008 | Ido | |
| 2015/0015216 A1 * | 1/2015 | Willis | H02J 3/1842 |
| | | | 323/207 |
| 2016/0262621 A1 * | 9/2016 | Yost | A61B 5/0051 |
| 2020/0221435 A1 | 7/2020 | Kim et al. | |
| 2020/0259604 A1 * | 8/2020 | Hadani | H04B 7/005 |
| 2020/0389268 A1 | 12/2020 | Sathyanarayan et al. | |
| 2021/0099230 A1 * | 4/2021 | Nishioka | H04B 10/2575 |
| 2021/0111786 A1 | 4/2021 | Pfadler | |
| 2021/0234647 A1 * | 7/2021 | Lee | H04B 17/364 |
| 2021/0281374 A1 * | 9/2021 | Kim | H04J 13/0048 |
| 2023/0012639 A1 * | 1/2023 | Fu | H04W 72/53 |
| 2023/0045595 A1 * | 2/2023 | Hebron | H04L 5/0048 |
| 2023/0164013 A1 * | 5/2023 | Kons | H04L 27/26532 |

OTHER PUBLICATIONS

R. Hadani et al., "Orthogonal Time Frequency Space Modulation," 2017 IEEE Wireless Communications and Networking Conference (WCNC), 2017.

G. D. Surabhi and A. Chockalingam, "Low-Complexity Linear Equalization for OTFS Modulation," in IEEE Communications Letters, vol. 24, No. 2, Feb. 2020.

Li, Yixiao et al., "Doppler Shift Estimation Based Channel Estimation for Orthogonal Time Frequency Space System", 2021 IEEE 94th Vehicular Technology Conference (VTC2021-Fall), Sep. 27, 2021.

* cited by examiner

WIRELESS COMMUNICATION DEVICE, SYSTEM, METHOD, AND NON-TRANSITORY COMPUTER-READABLE MEDIUM

This application is a National Stage Entry of PCT/JP2022/001862 filed on Jan. 19, 2022, which claims priority from Japanese Patent Application 2021-160872 filed on Sep. 30, 2021, the contents of all of which are incorporated herein by reference, in their entirety.

TECHNICAL FIELD

The present disclosure relates to a wireless communication device, a system, a method, and a program, and more particularly, to a wireless communication device, a system, a method, and a program capable of accurately demodulating an orthogonal time frequency space (OTFS) signal with a small amount of calculation while maintaining an OTFS signal of a high data rate.

BACKGROUND ART

In recent years, it has been studied to perform large-capacity communication between a base station (BS) and a user equipment (UE) that moves at a high speed. However, orthogonal frequency division multiplexing (OFDM) modulation schemes used in the fourth generation (4G) and the fifth generation (5G) have a problem that tolerance to a frequency error due to the Doppler effect or the like is low. In recent years, use of a frequency in a high frequency band such as a millimeter wave greatly affected by the Doppler effect has been studied, and it has been a problem to increase tolerance to the Doppler effect.

In order to correct the Doppler effect by the OFDM, it is necessary to increase the number of reference signals and frequently update and correct the result of estimation (channel estimation) of the propagation channel. However, when the reference signal is increased, the number of elements that can be used for data decreases, and the data rate lowers. In addition, since the channel estimation is frequently updated, there is a problem that an amount of calculation for processing data increases.

Therefore, Non-Patent Literature 1 proposes an orthogonal time frequency space (OTFS) modulation scheme. The OTFS modulation does not arrange data in a frequency time (FT) space like the OFDM modulation, but arranges data in a Delay Doppler (DD) space.

The OTFS modulation arranges and modulates data in the DD space, and thus has high tolerance to a frequency error due to the Doppler effect or the like. Therefore, it is expected that high-speed communication (high data rate) becomes possible for UE that moves at a high speed.

In the OTFS modulation, the influence of the propagation channel between the UE and the base station is corrected by obtaining a channel impulse response (CIR) using a reference signal (RS). In order to obtain the CIR, a wide DD space is generally required. Therefore, if the RS is frequently arranged, the data rate lowers.

Therefore, for example, instead of arranging the RS in all the subframes, it is conceivable to intermittently arrange the RS. However, the CIRs obtained in different subframes degrade in accuracy by the influence of the frequency error due to a Doppler effect or the like. The accuracy degradation of the CIR results in lowering in demodulation accuracy, and as a result, the data rate (throughput) lowers.

In the OTFS modulated signal, data is arranged in the DD space. In order to correct the influence of the propagation channel of the data in the DD space, it is necessary to perform a convolution operation with the correction coefficient obtained from the CIR and the received data. However, the convolution operation has a large amount of calculation, and a large amount of calculation is further required to obtain a correction coefficient (see Non-Patent Literature 2).

Therefore, a method for accurately demodulating an OTFS signal with a small amount of calculation while maintaining an OTFS signal of a high data rate is required.

Paragraph 0237 of Patent Literature 1 describes that "for example, when a target antenna port is a specific NZP CSI-RS, the NZP CSI-RS antenna ports can be instructed/set to be QCL with a specific TRS from the viewpoint of QCL-Type A and a specific SSB from the viewpoint of QCL-Type D. The terminal having received such an instruction/setting can receive the NZP CSI-RS by using the Doppler and delay values measured in the QCL-TypeA TRS and apply the reception beam used for the QCL-TypeD SSB reception to the NZP CSI-RS reception". Patent Literature 1 does not describe accurately demodulating an OTFS signal with a small amount of calculation while maintaining an OTFS signal of a high data rate.

Paragraph 0076 of Patent Literature 2 describes that "a receiver receives a combination of direct and duplicate OTFS pilot bursts as a channel convolutional OTFS pilot burst. The order of incoming OTFS pilot bursts to the receiver is 1) a direct OTFS pilot burst and then a frequency deviation duplicate OTFS pilot burst". Furthermore, paragraph 0199 of Patent Literature 2 describes "each data symbol is distributed in a lossless and reversible mode manner across a plurality of distinguishable (e.g., typically mutually orthogonal) waveforms over a plurality of different times and different frequencies selected according to the time delay and Doppler deviation channel response parameters of the wireless multi-dimensional data channel". Patent Literature 2 does not describe accurately demodulating an OTFS signal with a small amount of calculation while maintaining an OTFS signal of a high data rate.

CITATION LIST

Patent Literature

Patent Literature 1: Published Japanese Translation of PCT International Publication for Patent Application, No. 2021-502783
Patent Literature 2: Japanese Unexamined Patent Application Publication No. 2020-205641

Non Patent Literature

Non Patent Literature 1: R. Hadani et al., "Orthogonal Time Frequency Space Modulation," 2017 IEEE Wireless Communications and Networking Conference (WCNC), 2017, pp. 1-6.
Non Patent Literature 2: G. D. Surabhi and A. Chockalingam, "Low-Complexity Linear Equalization for OTFS Modulation," in IEEE Communications Letters, vol. 24, no. 2, pp. 330-334, February 2020.

SUMMARY OF INVENTION

Technical Problem

As described above, there is a problem that a method for accurately demodulating an OTFS signal with a small amount of calculation while maintaining an OTFS signal of a high data rate is required.

An object of the present disclosure is to provide a wireless communication device, a system, a method, and a program that solve the problems described above.

Solution to Problem

A wireless communication device according to the present disclosure includes
a reception unit configured to perform channel estimation using a first reference signal, perform phase correction mainly using a second reference signal, and demodulate a received orthogonal time frequency space (OTFS) signal using results of the channel estimation and the phase correction.
A system according to the present disclosure includes
a user equipment and a base station, in which
the user equipment includes
a transmission unit configured to transmit a first reference signal, an orthogonal time frequency space (OTFS) signal, and a second reference signal, and
the base station includes
a reception unit configured to perform channel estimation using the first reference signal, perform phase correction using the second reference signal, and demodulate the received OTFS signal using results of the channel estimation and the phase correction.
A method according to the present disclosure includes
performing channel estimation using a first reference signal, performing phase correction using a second reference signal, and demodulating a received orthogonal time frequency space (OTFS) signal using results of the channel estimation and the phase correction.
A program according to the present disclosure causes a computer to execute
performing channel estimation using a first reference signal, performing phase correction using a second reference signal, and demodulating a received orthogonal time frequency space (OTFS) signal using results of the channel estimation and the phase correction.

Advantageous Effects of Invention

According to the present disclosure, it is possible to provide a wireless communication device, a system, a method, and a program capable of accurately demodulating an orthogonal time frequency space (OTFS) signal with a small amount of calculation while maintaining an OTFS signal of a high data rate.

EXAMPLE EMBODIMENTS

Figures 1, 2:
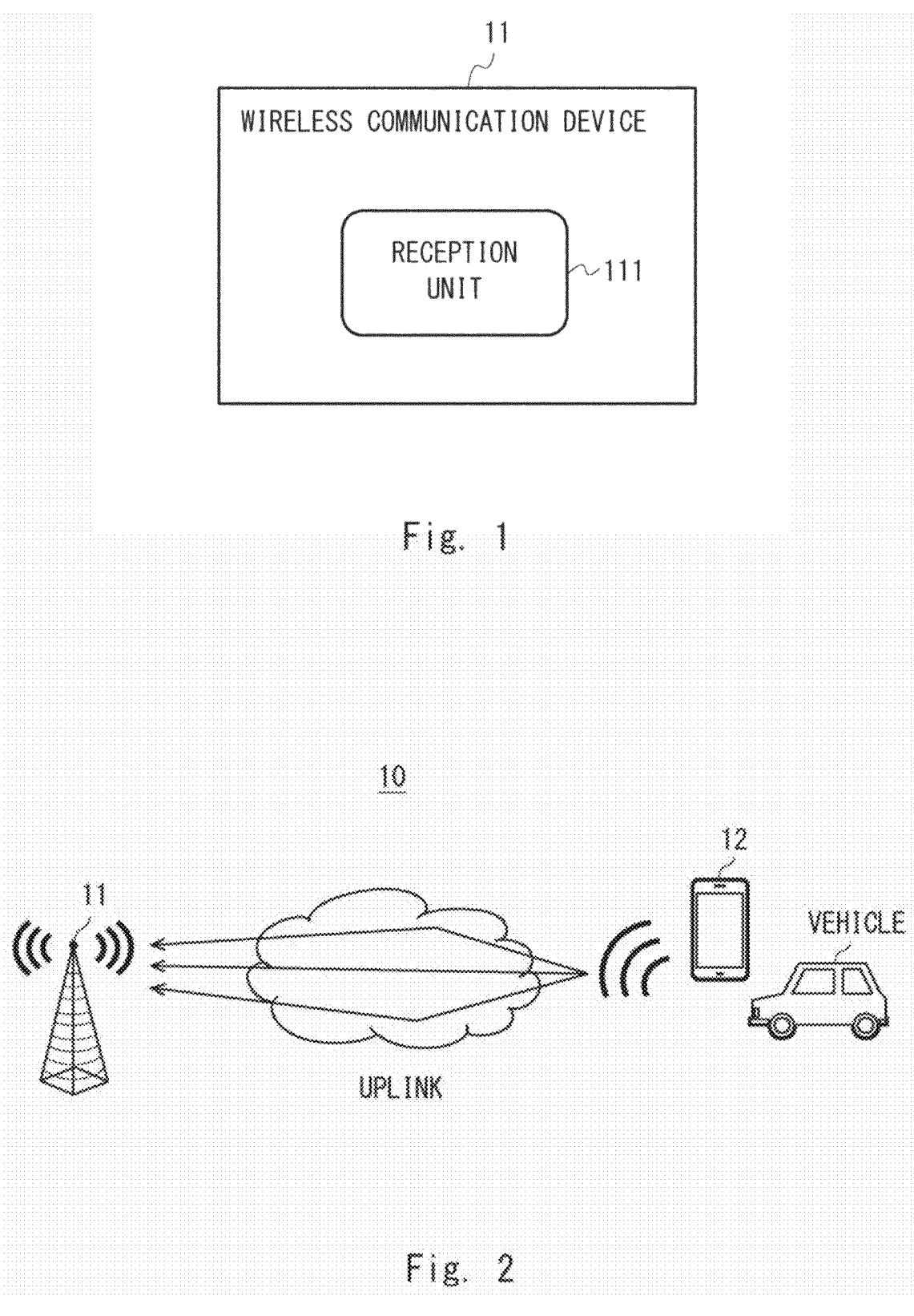
FIG. 1 is a block diagram illustrating a wireless communication device according to a first example embodiment.
FIG. 2 is a block diagram illustrating a system according to the first example embodiment.

Hereinafter, example embodiments of the present invention will be described with reference to the drawings. In the drawings, the same or corresponding elements are denoted by the same reference numerals and signs and redundant explanation will be omitted as necessary for clarity of explanation.

First Example Embodiment

<Outline>
FIG. 1 is a block diagram illustrating a wireless communication device according to a first example embodiment.
FIG. 1 illustrates a minimum configuration of a wireless communication device according to the first example embodiment.
FIG. 2 is a block diagram illustrating a system according to the first example embodiment.
As illustrated in FIG. 1, a wireless communication device 11 according to the first example embodiment includes a reception unit 111. The reception unit 111 performs channel estimation using a first reference signal, performs phase correction using a second reference signal, and demodulates a received orthogonal time frequency space (OTFS) signal using the results of the channel estimation and the phase correction. Note that the wireless communication device may be referred to as a wireless base station or a base station.
The reception unit 111 receives and demodulates, for example, an OTFS signal including a subframe in which the first reference signal is arranged and a subframe in which the second reference signal is arranged.
As illustrated in FIG. 2, a system 10 according to the first example embodiment includes a base station (BS) 11 and user equipment (UE) 12. The UE 12 includes a transmission unit (not illustrated) that transmits the first reference signal, the OTFS signal, and the second reference signal. The base station 11 includes a reception unit (not illustrated) that receives the first reference signal, the data, and the second reference signal.
The UE 12 is mounted on, for example, a vehicle and moves at a high speed. In the first example embodiment, an uplink transmitted from the UE 12 to the base station 11 will be described, but the present invention is not limited thereto. The first example embodiment can also be applied to a downlink transmitted from the base station 11 to the UE 12, similarly to the uplink.
The OTFS modulated high frequency signal is transmitted from the transmission unit of the UE 12 to the reception unit of the base station 11. The high frequency signal reaches the base station 11 via attenuation by propagation, and reflection, diffraction, and transmission by an obstacle such as a building. These influences such as attenuation and reflection are collectively referred to as a propagation channel. In addition, when the UE 12 moves at a high speed, the frequency of the high frequency signal transmitted from the UE 12 is slightly shifted and received by the base station 11 due to the Doppler effect.

The reception unit of the base station 11 receives the OTFS modulated radio frequency signal, performs channel estimation of the propagation channel using the first reference signal of the down-converted OTFS signal, performs phase correction using the second reference signal, and demodulates the received OTFS signal using the results of the channel estimation and the phase correction. The reception unit of the base station 11 corrects and demodulates an OTFS signal (high frequency signal) affected by the propagation channel and the Doppler effect using a technology to be described later.

Note that the first reference signal is a channel impulse response-reference signal (CIR-RS) for obtaining a channel impulse response (CIR). The second reference signal is a phase compensation reference signal (PCRS) mainly for performing phase correction.

<Configuration>

Figure 3:
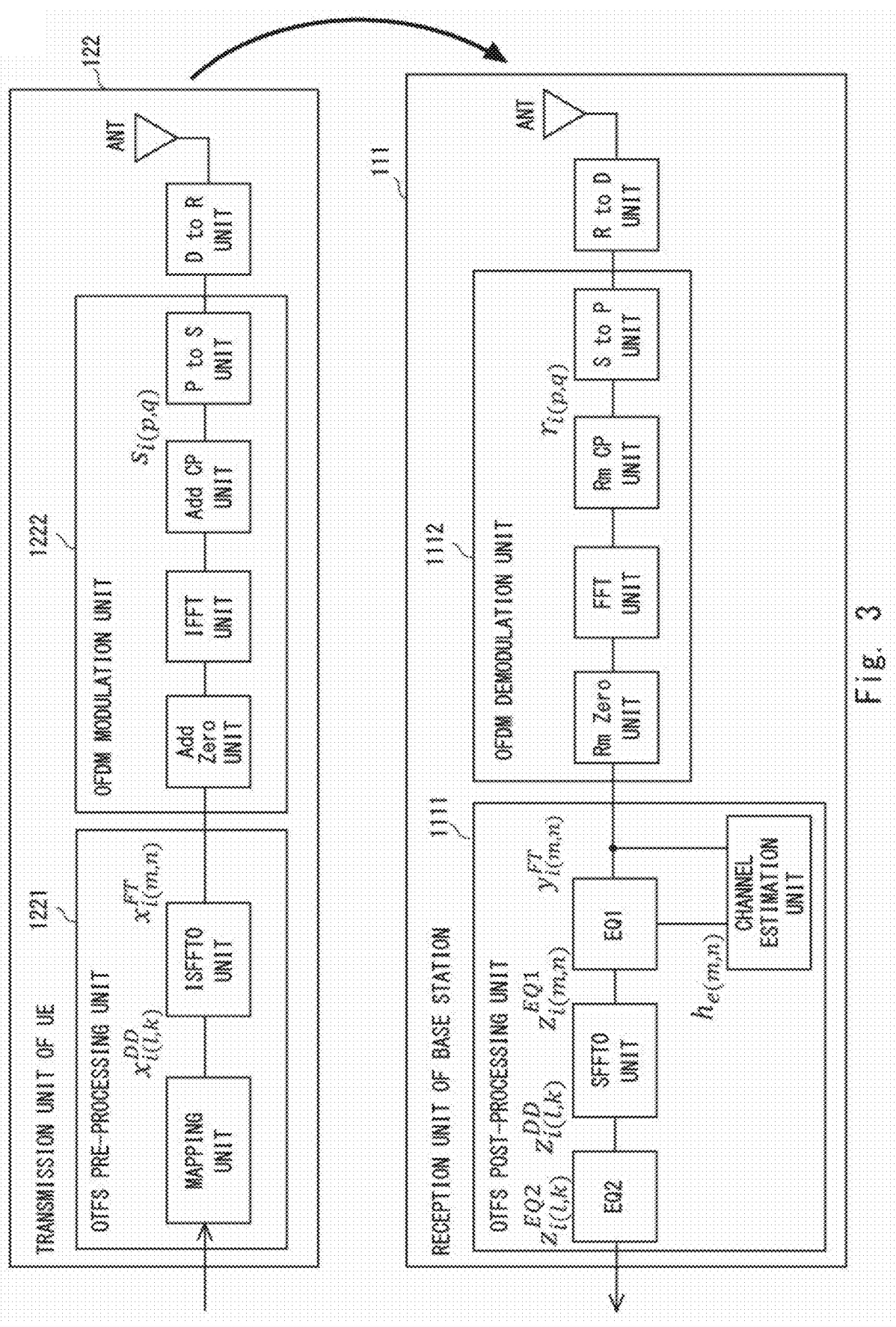
FIG. 3 is a block diagram illustrating a configuration of a UE and a base station according to the first example embodiment.

FIG. 3 is a block diagram illustrating a configuration of the UE and the base station according to the first example embodiment.

FIG. 3 illustrates the transmission unit 122 of the UE 12 and the reception unit 111 of the base station 11.

In this example, an uplink from the UE 12 to the base station 11 will be described.

As illustrated in FIG. 3, the transmission unit 122 of the UE 12 includes an OTFS preprocessing unit 1221 that performs OTFS preprocessing, an orthogonal frequency division multiplexing (OFDM) modulation unit 1222 that performs OFDM modulation, a D to R unit that converts a digital signal into a radio frequency (RF) signal, and an antenna (ANT). Note that the signal may also be referred to as data.

The OTFS preprocessing unit 1221 includes a mapping unit that arranges a reference signal (RS), data, and the like in each element, and an ISFFT0 unit that performs inverse Symplectic Finite Fourier Transformation (SFFT).

The OFDM modulation unit 1222 performs the process similar to the normal OFDM modulation. The OFDM modulation unit 1222 includes an Add Zero unit that adds zero data to outside the band of data, an IFFT unit that performs inverse Fourier transformation, an Add CP unit that adds a cyclic prefix (CP), and a P to S unit that converts data from parallel to serial.

The reception unit 111 of the base station 11 includes an antenna (ANT), an R to D unit that converts the received RF signal into a digital signal, an OFDM demodulation unit 1112, and an OTFS postprocessing unit 1111.

The OFDM demodulation unit 1112 performs the process similar to the normal OFDM demodulation. The OFDM demodulation unit 1112 includes an S to P unit that converts digital data from serial to parallel, an Rm CP unit that removes CP, an FFT unit that performs fast Fourier transformation (FFT), and an Rm Zero unit that removes components outside the band.

The OTFS postprocessing unit 1111 includes a channel estimation unit that estimates a propagation channel, a first equalizer EQ1, an SFFT0 unit that performs SFFT, and a second equalizer EQ2.

The first equalizer EQ1 performs channel correction based on the first reference signal in the FT space. The second equalizer EQ2 performs the phase correction process based on the second reference signal in the DD space.

After the first equalizer EQ1 performs the channel correction, the second equalizer EQ2 performs the phase correction process.

The channel estimation unit performs the channel estimation using the first reference signal to obtain a channel impulse response (CIR). The first equalizer EQ1 performs the channel correction on the OTFS signal based on the obtained CIR.

Figure 4:
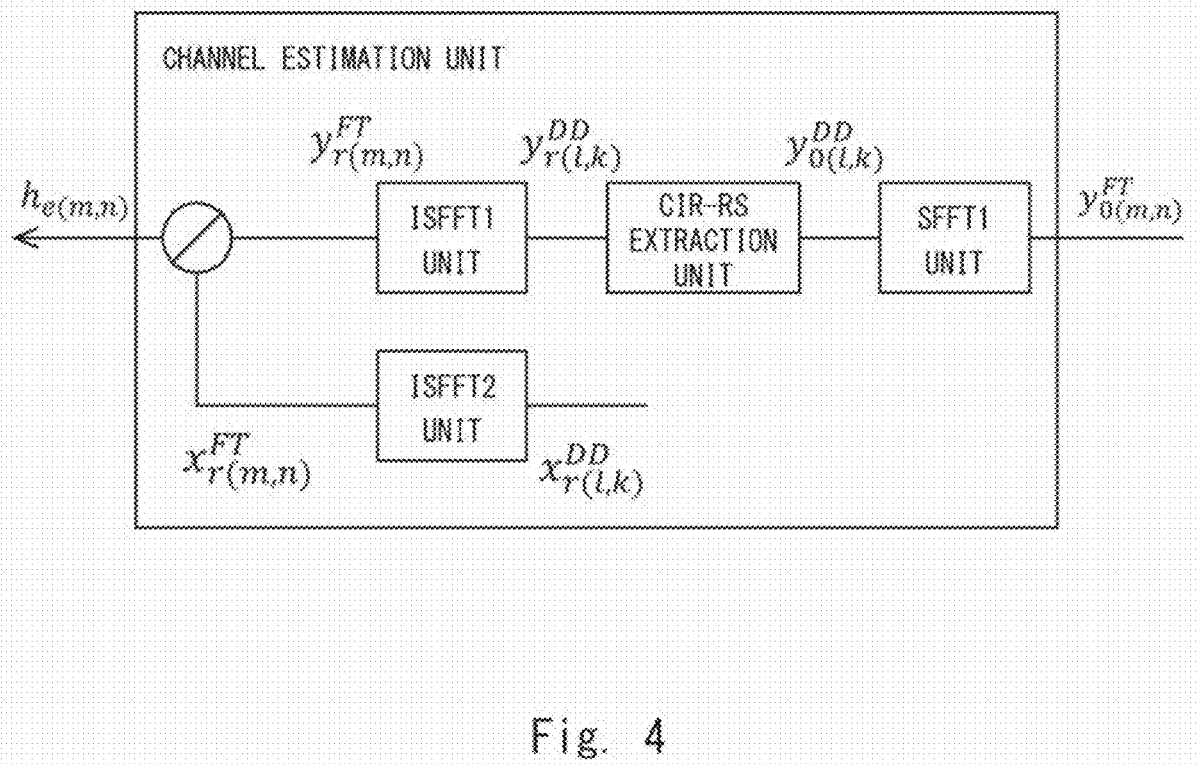
FIG. 4 is a block diagram illustrating a channel estimation unit according to the first example embodiment.

FIG. 4 is a block diagram illustrating a channel estimation unit according to the first example embodiment.

FIG. 4 illustrates details of the channel estimation unit.

As illustrated in FIG. 4, the channel estimation unit includes an SFFT1 unit that performs SFFT, a Channel Impulse Response-Reference Signal (CIR-RS) extraction unit that extracts an element region of the surrounding of the CIR-RS, an ISFFT1 unit that performs ISFFT, and an ISFFT2 unit that performs ISFFT on a reference signal (RS).

<Operation>
<Operation of UE>

In the transmission unit 122 of the UE 12, the mapping unit arranges the RS and data in the DD space.

Figure 5:
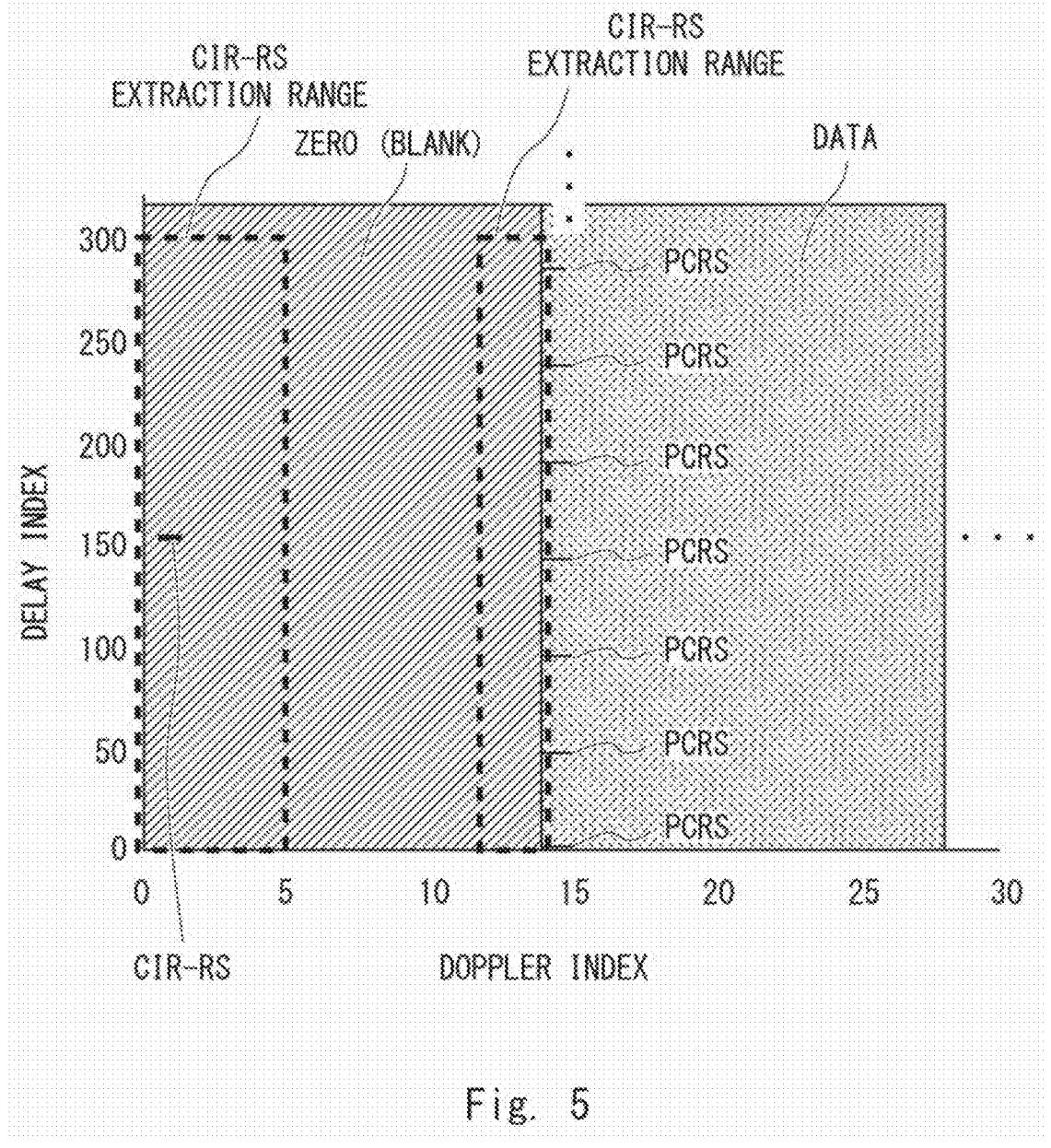
FIG. 5 is a schematic diagram illustrating an arrangement of CIR-RS, PCRS, and data according to the first example embodiment.

FIG. 5 is a schematic diagram illustrating an arrangement of CIR-RS, PCRS, and data according to the first example embodiment.

In FIG. 5, the horizontal axis represents a Doppler index, and the vertical axis represents a delay index.

In this example, the total number of indices M in the delay direction in one subframe is M=1200, the total number of indices N in the Doppler direction is N=14, and one frame is formed with 10 subframes.

The number of subframes in which only CIR-RS (first reference signal) is arranged may be one per frame, and the number of subframes in which data and PCRS (second reference signal) are arranged may be two or more.

Specifically, in the 0th subframe, only the CIR-RS is arranged, and all the elements in which no CIR-RS is arranged are zero (blank). The CIR-RS is arranged at the element position of the delay index $l_0$=150 and the Doppler index $k_0$=1. In this example, the CIR-RS is arranged in only one element, but this is not the sole case. The CIR-RS may be arranged in a certain element range. In addition, data may be arranged within a range that does not affect a CIR-RS analysis range described later.

Data and a phase compensation reference signal (PCRS) are arranged in the first to ninth subframes. In this example, the PCRS is arranged at the element positions of the delay indices $l_p$=0, 48, 96, . . . , and 1152 and the Doppler index $k_p$=0 of each subframe. The PCRS is a known QPSK signal distributed in a random number form. However, the element position and data of the PCRS are not limited thereto.

As described above, the i-th subframe signal arranged in the DD space is $x_{i(l, k)}^{DD}$. Here, l=0, 1, . . . , M−1, k=0, 1, . . . , N−1, i=0, 1, . . . , 9. As a result, in particular, the signal $x_{0(l, k)}^{DD}$ of the zeroth subframe is expressed by equation (1).

$$x_{0(l,k)}^{DD} = \begin{cases} 1 & (l = l_0, k = k_0) \\ 0 & (l \neq l_0 \text{ or } k \neq k_0) \end{cases}. \tag{1}$$

The signal $x_{i(l, k)}^{DD}$ is OTFS modulated for each subframe. The modulation method is similar to the methods described in non-patent literature 1 and non-patent literature 2.

First, the signal $x_{i(l,\ k)}^{DD}$ is converted into a signal $x_{i(m,\ n)}^{FT}$, (m=0, 1, . . . , M−1, n=0, 1, . . . , N−1) in the FT space from the DD space by the ISFFT. As shown in equation (2), the signal $x_{i(m,\ n)}^{FT}$ is calculated by performing Fourier transformation and inverse Fourier transformation in the Delay direction and the Doppler direction by ISFFT.

$$x_{i(m,n)}^{FT} = \frac{1}{N}\sum_{k=0}^{N-1}\sum_{l=0}^{M-1} x_{i(l,k)}^{DD} e^{-j\frac{2\pi}{M}ml} e^{j\frac{2\pi}{N}nk}. \tag{2}$$

The signal $x_{i(m,\ n)}^{FT}$ is OFDM modulated through a normal method in the OFDM modulation unit 1222. The OFDM modulated OTFS signals $s_{i(p,\ q)}$ (where p=0, 1, . . . , M−1, q=0, 1, . . . , N−1) are expressed by equations (3) and (4).

$$s_{i(p,q)} = \frac{1}{M}\sum_{m=0}^{M-1} x_{i(m,q)}^{FT} e^{j\frac{2\pi}{M}pm}. \tag{3}$$

$$= \frac{1}{N}\sum_{k=0}^{N-1} x_{i(p,k)}^{DD} e^{j\frac{2\pi}{N}qk} \tag{4}$$

Here, for the sake of simplicity, the addition of the out-of-band zero data in the Add Zero unit and the addition of the CP in the Add CP unit are ignored (omitted). Then, the signal $s_{0(p,q)}$ of the 0th subframe is expressed by expression (5) by equations (1) and (4).

$$s_{0(p,q)} = \begin{cases} \frac{1}{N}e^{j\frac{2\pi}{N}k_0 q} & (p = l_0) \\ 0 & (p \neq l_0) \end{cases} \tag{5}$$

The P to S unit of the transmission unit 122 of the UE 12 performs parallel-serial conversion on the signal $s_{i(p,\ q)}$ to convert to a digital baseband signal. The D to R unit converts a digital baseband signal into an analog baseband signal, and further converts the analog baseband signal into an RF signal of a carrier frequency band. The RF signal is emitted into air from the ANT.

<Operation of Base Station>

The reception unit 111 of the base station 11 receives the RF signal from the UE 12 by the ANT, and converts the RF signal into a digital baseband signal in the R to D unit. The S to P unit serial-to-parallel converts the digital baseband signal into a reception signal $r_{i(p,\ q)}$.

The OFDM demodulation unit 1112 performs OFDM demodulation through a normal method on the reception signal $r_{i(p,\ q)}$. Here, it is assumed that the UE 12 and the base station 11 are synchronized in timing by a normal method. The Rm CP unit of the OFDM demodulation unit 1112 removes the CP from the reception signal $r_{i(p,\ q)}$. Thereafter, the FFT unit performs Fourier transformation, and the Rm Zero unit removes the out-of-band zero component. The signal $y_{i(m,\ n)}^{FT}$ obtained through OFDM demodulation by the OFDM demodulation unit 1112 can be expressed by equations (6) and (7).

$$y_{i(m,n)}^{FT} = \sum_{p=0}^{M-1} r_{i(p,n)} e^{-j\frac{2\pi}{M}mp}. \tag{6}$$

-continued $$= h_{(m,n)}\sum_{p=0}^{M-1} s_{i(p,n)} e^{j\omega_0 t_s(MNi+Mn+p)} e^{-j\frac{2\pi}{M}mp}. \tag{7}$$

Here, for the sake of simplicity, CP removal, out-of-band zero data removal, and noise components are ignored (omitted). In Equation (7), $h_{(m,\ n)}$ represents a propagation channel, $\omega_0$ represents an angular frequency corresponding to a frequency offset due to the Doppler effect, and $t_s$ represents a sampling interval (a reciprocal of a sampling rate). Therefore, $e^{(j\omega_0 t_s(MNi+Mn+p))}$ in equation (7) represents a phase change due to the Doppler effect.

The OTFS postprocessing is performed using the signal $y_{i(m,\ n)}^{FT}$. In this example, the channel estimation is performed using the 0th subframe in which the CIR-RS is arranged, and the CIR is obtained. The channel estimation is performed in the order illustrated in FIG. 4. First, SFFT is performed on the signal $y_{0(m,\ n)}^{FT}$ in the SFFT1 unit to convert to a signal $y_{0(l,\ k)}^{DD}$ in the DD space from the FT space. The signal $y_{0(l,\ k)}^{DD}$ is expressed by equation (8).

$$y_{0(l,k)}^{DD} = \frac{1}{M}\sum_{n=0}^{N-1}\sum_{m=0}^{M-1} y_{0(m,n)}^{TF} e^{j\frac{2\pi}{M}lm} e^{-j\frac{2\pi}{N}kn} \tag{8}$$

The CIR-RS extraction unit extracts only surrounding elements in which the CIR-RS is arranged from the signal $y_{0(l,\ k)}^{DD}$. This extracted range is referred to as a CIR-RS extraction range. In this example, as indicated by a dotted line in FIG. 5, a range of +/−150 indices in the Delay direction and +/−3 indices in the Doppler direction is extracted from the element in which the CIR-RS is arranged. When the CIR-RS extraction range goes beyond the subframe end, the range is set by folding back in the subframe as indicated by a dotted line in FIG. 5. At this time, the value of the element outside the CIR-RS extraction range is set to zero. A signal after extraction of the CIR-RS is set to $y_{r(l,\ k)}^{DD}$.

The reason why the CIR-RS extraction range is made larger than the range in which the CIR-RS is arranged to extract the CIR-RS affected by radio wave propagation. That is, the CIR-RS is received at a position different from the position of the original element or a plurality of element positions in a distributed manner due to a delay, a Doppler effect, or the like. Then, the CIR is presumed (estimated) based on such a change in the CIR-RS.

In addition, by extracting the surroundings of the CIR-RS, the influence of thermal noise and the like can be suppressed, and the accuracy of channel estimation can be improved. In this example, only the CIR-RS is arranged in the 0th subframe, but this is not the sole case. Data, CIR-RSs for other UEs, and the like may be arranged in an element region that does not affect the CIR-RS extraction range.

The signal $y_{r(l,\ k)}^{DD}$ from which the CIR-RS has been extracted is subjected to ISFFT conversion similarly to the conversion in the ISFFT1 unit, that is, the processing (conversion) indicated by equation (2), and is again converted into the signal $y_{r(m,\ n)}^{FT}$ in the FT space. Since the signal $y_{r(m,n)}^{FT}$ is considered as a reception signal in a case where only the CIR-RS is transmitted, it is expressed as equation (9) on the basis of equations (7) and (5).

$$y_{r(m,n)}^{FT} = \frac{1}{N}h_{(m,n)} e^{j\frac{2\pi}{N}nk_0} e^{j\omega_0 t_s(Mn+l_0)} e^{-j\frac{2\pi}{M}ml_0} \tag{9}$$

Since the CIR-RS is a known signal, the base station 11 also creates the 0th subframe signal $x_{r(l,\ k)}{}^{DD}$ in which only the CIR-RS is arranged. In this example, the signal $x_{r(l,\ k)}{}^{DD}$ is equal to the signal $x_{0(l,\ k)}{}^{DD}$ expressed by equation (1). In the UE 12, only the CIR-RS is arranged in the 0th subframe, but even when data or the like is arranged in the 0th subframe in the UE 12, only the CIR-RS is arranged in the 0th subframe generated by the base station 11.

The signal $x_{r(l,\ k)}{}^{DD}$ in the DD space is subjected to ISFFT conversion by the ISFFT2 unit similarly to equation (2), and is converted into the signal $x_{r(m,\ n)}{}^{FT}$ in the FT space. The signal $x_{r(m,\ n)}{}^{FT}$ is expressed in equations (10) and (11).

$$x_{r(m,n)}^{FT} = \frac{1}{N}\sum_{k=0}^{N-1}\sum_{l=0}^{M-1} x_{r(l,k)}^{DD} e^{-j\frac{2\pi}{M}ml} e^{j\frac{2\pi}{N}nk}. \tag{10}$$

$$= \frac{1}{N} e^{-j\frac{2\pi}{M}ml_0} e^{j\frac{2\pi}{N}nk_0}. \tag{11}$$

When the same signal is used as the CIR-RS in each frame, it is not necessary to calculate the signal $x_{r(m,\ n)}{}^{FT}$ in each frame, and the signal may be calculated once first, and then the same signal may be repeatedly used. Furthermore, in this example, the signal $x_{r(m,\ n)}{}^{FT}$ is created from the signal $x_{r(l,\ k)}{}^{DD}$ using the ISFFT2 unit, but the present invention is not limited thereto. The signal $x_{r(m,\ n)}{}^{FT}$ created in advance may be held in a memory in the base station 11 and used.

The CIR coefficient $h_{c(m,\ n)}$ obtained by the channel estimation unit is obtained by calculating a quotient of the signal $y_{r(m,n)}{}^{FT}$ in the FT space of the CIR-RS obtained from the reception signal and the signal $x_{r(m,\ n)}{}^{FT}$ in the FT space of the CIR-RS not affected by the propagation channel. That is, the channel estimation unit calculates a quotient obtained by dividing the CIR-RS (first reference signal) obtained from the received OTFS signal by the CIR-RS (first reference signal) not affected by the propagation channel as the CIR coefficient $h_{c(m,\ n)}$ in the FT space. The CIR coefficient $h_{c(m,\ n)}$ is expressed by equations (12) and (13).

$$h_{c(m,n)} = y_{r(m,n)}^{FT} / x_{r(m,n)}^{FT} \tag{12}$$

$$= h_{(m,n)} e^{j\omega_0 t_s (Mn+l_0)} \tag{13}$$

As a result, a channel coefficient including the influence of the frequency error of the Doppler effect is calculated. The CIR coefficient $h_{c(m,\ n)}$ obtained in the 0th subframe is repeatedly used until the subframe in which the CIR-RS is arranged is again received.

The first equalizer EQ1 performs channel correction in the FT space using the CIR coefficient $h_{c(m,\ n)}$. The corrected signal $z_{i(m,\ n)}{}^{EQ1}$ is expressed in equations (14) and (15).

$$z_{i(m,n)}^{EQ1} = h_{c(m,n)}^{-1} y_{i(m,n)}^{FT} \tag{14}$$

$$= \sum_{p=0}^{M-1} s_{i(p,n)} e^{j\omega_0 t_s (MNi+p-l_0)} e^{-j\frac{2\pi}{M}mp}. \tag{15}$$

The signal $z_{i(m,\ n)}{}^{EQ1}$ is subjected to SFFT conversion in the SFFT0 unit and converted into a signal $z_{i(l,\ k)}{}^{DD}$ in the DD space. $z_{i(l,\ k)}{}^{DD}$ is expressed by equations (16) and (17).

$$z_{i(l,k)}^{DD} = \frac{1}{M}\sum_{n=0}^{N-1}\sum_{m=0}^{M-1} z_{i(m,n)}^{EQ1} e^{j\frac{2\pi}{M}lm} e^{-j\frac{2\pi}{N}kn} \tag{16}$$

$$= e^{j\omega_0 t_s (MNi+l-l_0)} x_{i(l,k)}^{DD} \tag{17}$$

As shown in equations (16) and (17), the phase shift due to the Doppler effect remains uncorrected in the signal $z_{i(l,\ k)}{}^{DD}$.

The phase shift due to the Doppler effect has two components. The first component is $e^{(j\omega_0 t_s MNi)}$, which is a phase shift for each subframe, and is caused by using the CIR obtained in the 0th subframe in a subsequent subframe. The second component is $e^{(j\omega_0 t_s (l-l_0))}$, which is a phase shift that depends on the difference in the Delay direction from the position where the CIR-RS is arranged.

This phase shift is corrected by the second equalizer EQ2 using the PCRS. The correction coefficient $w_{i(l,\ k)}$ used in the second equalizer EQ2 is obtained as shown in equations (18) and (19) by calculating the quotient of the original signal of the PCRS (known signal determined in advance between the transmission side and the reception side) and the reception signal.

$$w_i(l\in l_p, k\in k_p) = x_{i(l\in l_p, k\in k_p)}^{DD} / z_{i(l\in l_p, k\in k_p)}^{DD} \tag{18}$$

$$= e^{-j\omega_0 t_s (MNi+l+l_0)} \tag{19}$$

Here, the subframe number i is an integer from 1 to 9. The correction coefficient of the Delay index in which the PCRS does not exist $$W_{i(l\neq l_p, k\in k_p)}$$

is obtained by interpolation and extrapolation from neighboring correction coefficients. In addition, the correction coefficient of the Doppler index in which the PCRS does not exist $$W_{i(l,k\neq k_p)}$$

uses a value equal to the correction coefficient $w_{i(l,\ k\in k_p)}$ of the Doppler index in which the PCRS exists.

$$(W_{i(l,k\neq k_p)} = W_{i(l,k\in k_p)})$$

When data is arranged in the 0th subframe, a PCRS is added to a position that does not affect the extraction range of the CIR-RS, and correction is performed in the same manner as described above. Alternatively, it may be obtained by extrapolation using a correction coefficient of the same Delay index of the correction coefficient $w_{i(l,\ k)}$ (i=1, 2, . . . , 9) in the previous frame or the same frame.

The second equalizer EQ2 performs correction by multiplying the reception signal $z_{i(l,k)}{}^{DD}$ by the correction coefficient $w_{i(l,\ k)}$. The signal $z_{i(l,\ k)}{}^{EQ2}$ corrected by the second equalizer EQ2 is shown in equations (20) and (21).

$$z_{i(l,k)}^{EQ2} = w_{i(l,k)} z_{i(l,k)}^{DD} \tag{20}$$

$$= x_{i(l,k)}^{DD} \tag{21}$$

By using the second equalizer EQ2, the phase shift caused by the Doppler effect is corrected, and the transmission signal is correctly received. Note that, in this example, the amplitude change is ignored for the sake of simplicity, but the amplitude change for each subframe can also be corrected by using the second equalizer EQ2.

Effects

The base station 11 according to the first example embodiment performs channel correction in the FT space. As a result, the amount of calculation can be suppressed. For example, a case where one UE 12 and the base station 11 communicate with each other will be considered. At this time, in a case where the channel correction is performed in the DD space, it is necessary to obtain a reciprocal of a matrix of (MN×MN) dimensions and perform a convolution operation with the reception signal (see Non-Patent Literature 2). On the other hand, in the first example embodiment, since it is only necessary to obtain the reciprocal of each element of the matrix of M×N dimension and multiply each element of the reception signal, the amount of calculation can be suppressed.

In addition, since the base station 11 according to the first example embodiment performs channel correction in the FT space, even when an OTFS signal is used, a spatial multiplexing technique can be used by a normal method. As a result, simultaneous and identical frequency connection of a plurality of UEs 12 is possible, and the communication capacity of the base station 11 can be increased.

As a result, it is possible to provide a wireless communication device, a system, a method, and a program capable of accurately demodulating an orthogonal time frequency space (OTFS) signal with a small amount of calculation while maintaining an OTFS signal of a high data rate.

In addition, the base station 11 according to the first example embodiment uses two types of RSs, a CIR-RS and a PCRS. As a result, both the influence of the propagation channel and the influence of the Doppler effect can be corrected.

Specifically, by using the second equalizer EQ2 using the PCRS, the CIR obtained in a subframe different from the data to be corrected can be used. Since channel estimation performed in each subframe CIR-RS leads to lowering in the data rate, a high data rate can be maintained by using a subframe in which channel estimation is not performed.

Figure 6A:
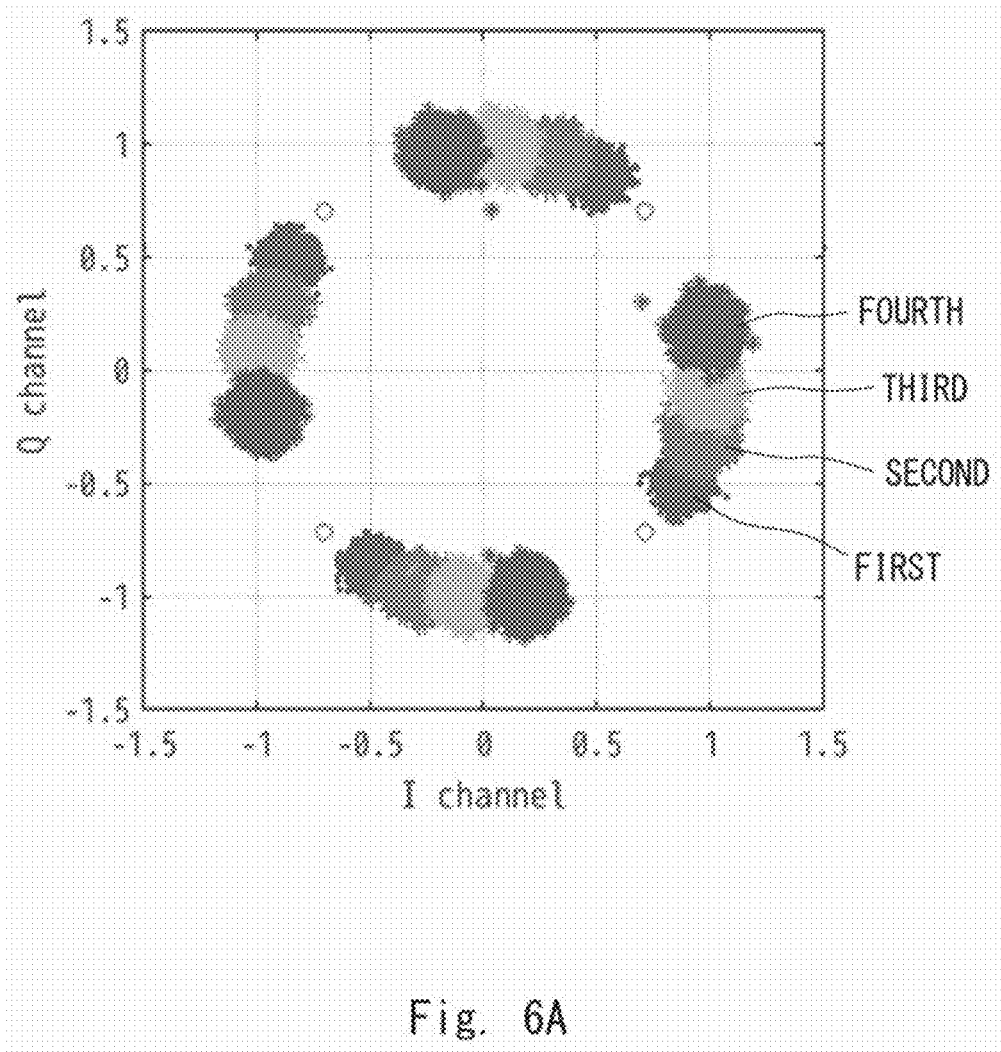
FIG. 6A is a constellation diagram illustrating an effect of correction by the base station according to the first example embodiment.
Figure 6B:
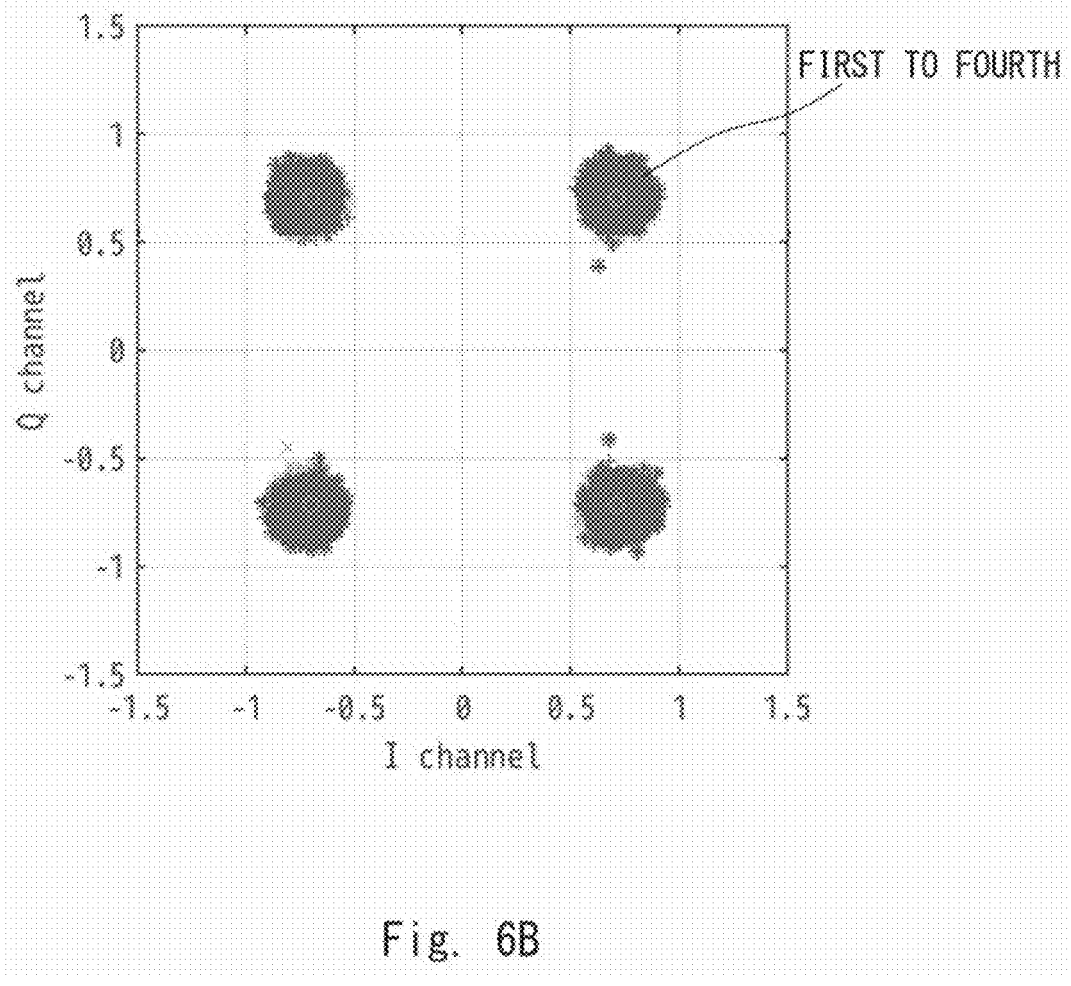
FIG. 6B is a constellation diagram illustrating an effect of correction by the base station according to the first example embodiment.

FIGS. 6A and 6B are constellation diagrams illustrating an effect of correction by the base station according to the first example embodiment.

In FIGS. 6A and 6B, the horizontal axis represents the I channel, and the vertical axis represents the Q channel.

FIGS. 6A and 6B illustrate results for a case where the UE is moved toward the base station at a walking speed (about 4 km/s). The carrier frequency is 28 GHz (gigahertz).

FIG. 6A is a constellation diagram in a case where the second equalizer EQ2 does not perform correction for each subframe.

FIG. 6B is a constellation diagram in a case where the second equalizer EQ2 performs correction for each subframe.

As illustrated in FIG. 6A, when the second equalizer EQ2 does not perform correction, the phase rotates every subframe after the first subframe. On the other hand, as illustrated in FIG. 6B, when the second equalizer EQ2 performs the correction, the phase rotation is corrected.

In addition, since the influence of the Doppler effect depending on the Delay index cannot be estimated only by the CIR, this influence remains with only by the first equalizer EQ1 (see equation 17). The base station 11 according to the first example embodiment can correct this influence and improve the demodulation accuracy by the second equalizer EQ2 using the PCRS.

Figure 7A:
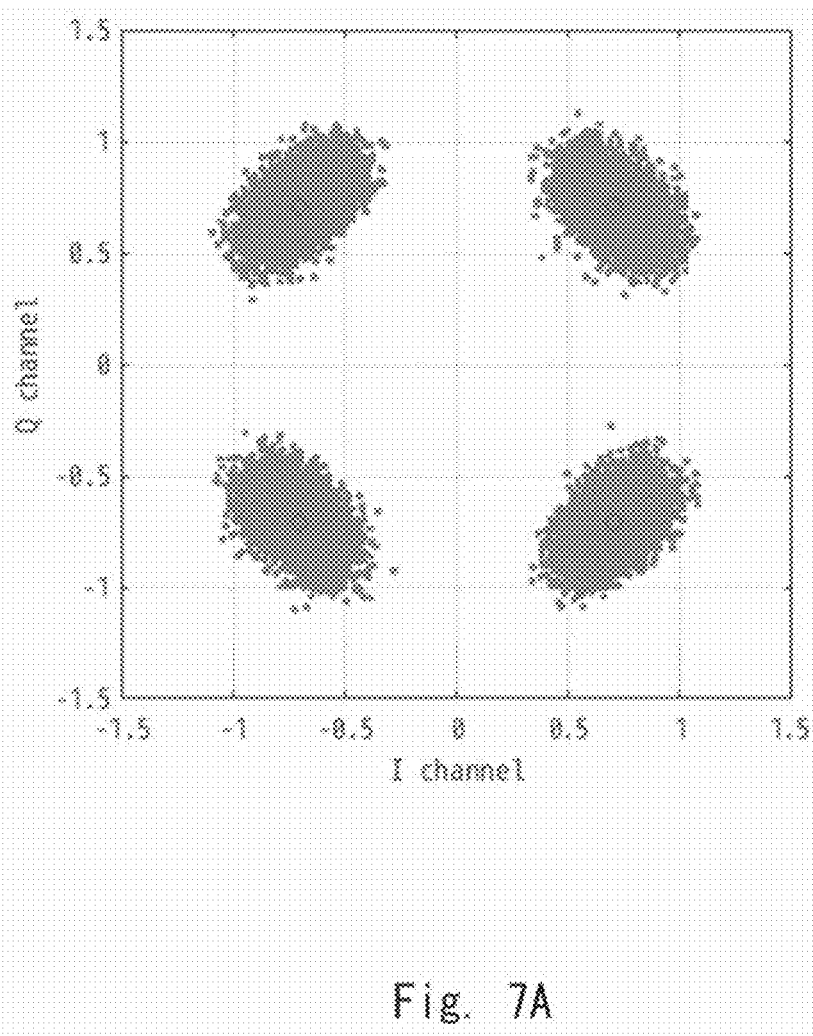
FIG. 7A is a constellation diagram illustrating an effect of correction in a Delay direction by the base station according to the first example embodiment.
Figure 7B:
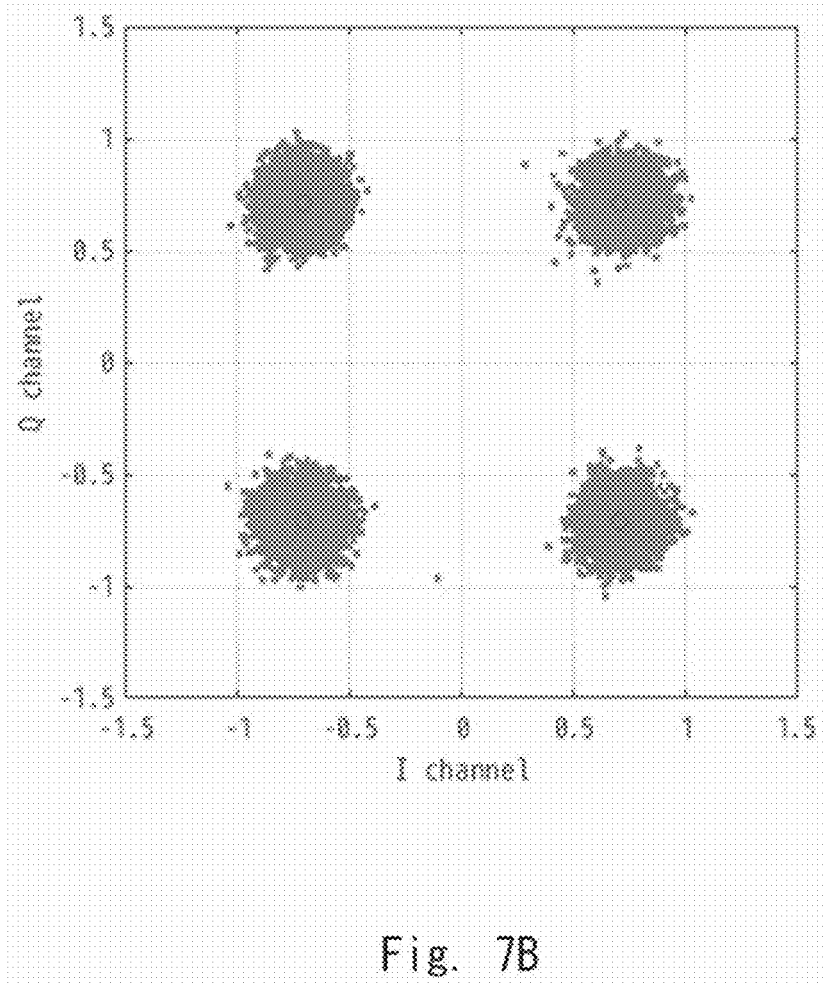
FIG. 7B is a constellation diagram illustrating an effect of correction in a Delay direction by the base station according to the first example embodiment.

FIGS. 7A and 7B are constellation diagrams illustrating the effect of correction in the Delay direction by the base station according to the first example embodiment.

In FIGS. 7A and 7B, the horizontal axis represents the I channel, and the vertical axis represents the Q channel.

FIGS. 7A and 7B illustrate measurement results in a case where it is assumed that the UE moves at a high speed, and a frequency error of 4 KHz (kilohertz) is given to the transmission unit of the UE and the reception unit of the base station. The frequency error of 4 kHz is equal to a situation in which the UE is moving towards the base station at approximately 150 km/h. The carrier frequency is 28 GHz (gigahertz).

FIG. 7A is a constellation diagram in a case where the second equalizer EQ2 does not perform correction in the Delay direction.

FIG. 7B is a constellation diagram in a case where the second equalizer EQ2 performs correction in the Delay direction.

FIGS. 7A and 7B illustrate a constellation between one subframe.

As illustrated in FIG. 7A, in a case where the second equalizer EQ2 does not perform correction in the Delay direction, dispersion occurs in the circumferential direction. On the other hand, as illustrated in FIG. 7B, in a case where the second equalizer EQ2 performs the correction in the Delay direction, the dispersion in the circumferential direction is corrected.

In addition, the base station 11 according to the first example embodiment converts the signal of the 0th subframe into the DD space using the SFFT1 unit and extracts the surroundings of the CIR-RS by the CIR-RS extraction unit, so that only the CIR-RS affected by the propagation channel can be extracted while suppressing noise.

Here, features of the base station according to the first example embodiment will be described below.

By using two types of reference signals (CIR-RS and PCRS) and using different equalizers, it is possible to accurately demodulate the OTFS signal with a small amount of calculation while maintaining a high data rate.

Second Example Embodiment

Figure 8:
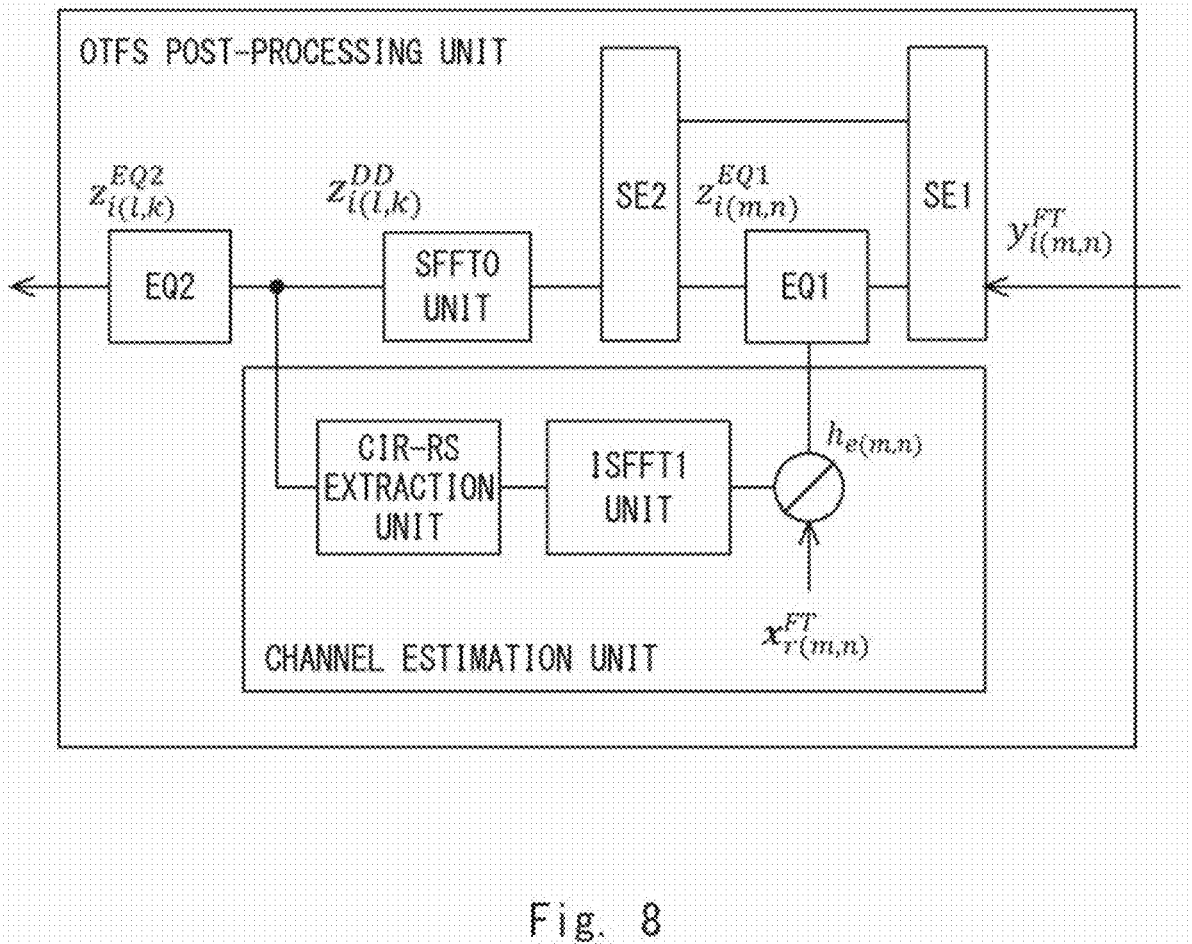
FIG. 8 is a block diagram illustrating an OTFS post-processing unit according to a second example embodiment.

FIG. 8 is a block diagram illustrating an OTFS post-processing unit according to a second example embodiment.

As illustrated in FIG. 8, the base station 21 according to the second example embodiment is different from the base station 11 according to the first example embodiment in that a first selector SE1 and a second selector SE2 are added. In addition, the base station 21 is different from the base station 11 in that an SFFT0 unit and an SFFT1 unit are common. The other elements (functional units) of the base station 21 are similar to those of the base station 11.

The first selector SE1 and the second selector SE2 are used to bypass the first equalizer EQ1 when estimating the CIR. For example, similarly to the first example embodiment, when a signal in which the CIR-RS is arranged in the 0th subframe is used, the first selector SE1 and the second selector SE2 are switched so as to bypass the first equalizer EQ1 at the time of the 0th subframe. On the other hand, in the first to ninth subframes, the first selector SE1 and the second selector SE2 are switched to use the first equalizer EQ1.

That is, the first selector SE1 and the second selector SE2 perform setting such that the subframe in which only the CIR-RS is arranged bypasses the first equalizer EQ1. In addition, the first selector SE1 and the second selector SE2 input the signal obtained by the OFDM demodulation to the first equalizer EQ1 in the subframe in which the CIR-RS is not arranged.

Note that, in a case where the first selector SE1 and the second selector SE2 are not used, the CIR coefficient $h_{c(m, n)}$ may be changed to 1 only when the CIR is estimated, and the correction in the first equalizer EQ1 may not be performed.

In addition, the SFFT0 unit and the SFFT1 unit according to the first example embodiment may be common. In order to realize this, as illustrated in FIG. 8, the channel estimation unit may include a CIR-RS (first reference signal) extraction unit and an inverse SFFT conversion unit (ISFFT1 unit). The SFFT0 unit (SFFT conversion unit) performs SFFT conversion on the signal on which the channel correction has been performed by the first equalizer EQ1. The CIR-RS extraction unit extracts the CIR-RS from the signal converted by the SFFT conversion unit. The ISFFT1 unit performs inverse SFFT conversion on the signal extracted by the CIR-RS extraction unit.

As a result, calculation of SFFT can be omitted (only one SFFT can be reduced) (see FIGS. 4 and 8), and thus, the amount of calculation in the reception unit can be reduced as compared with the first example embodiment.

Third Example Embodiment

Figure 9A:
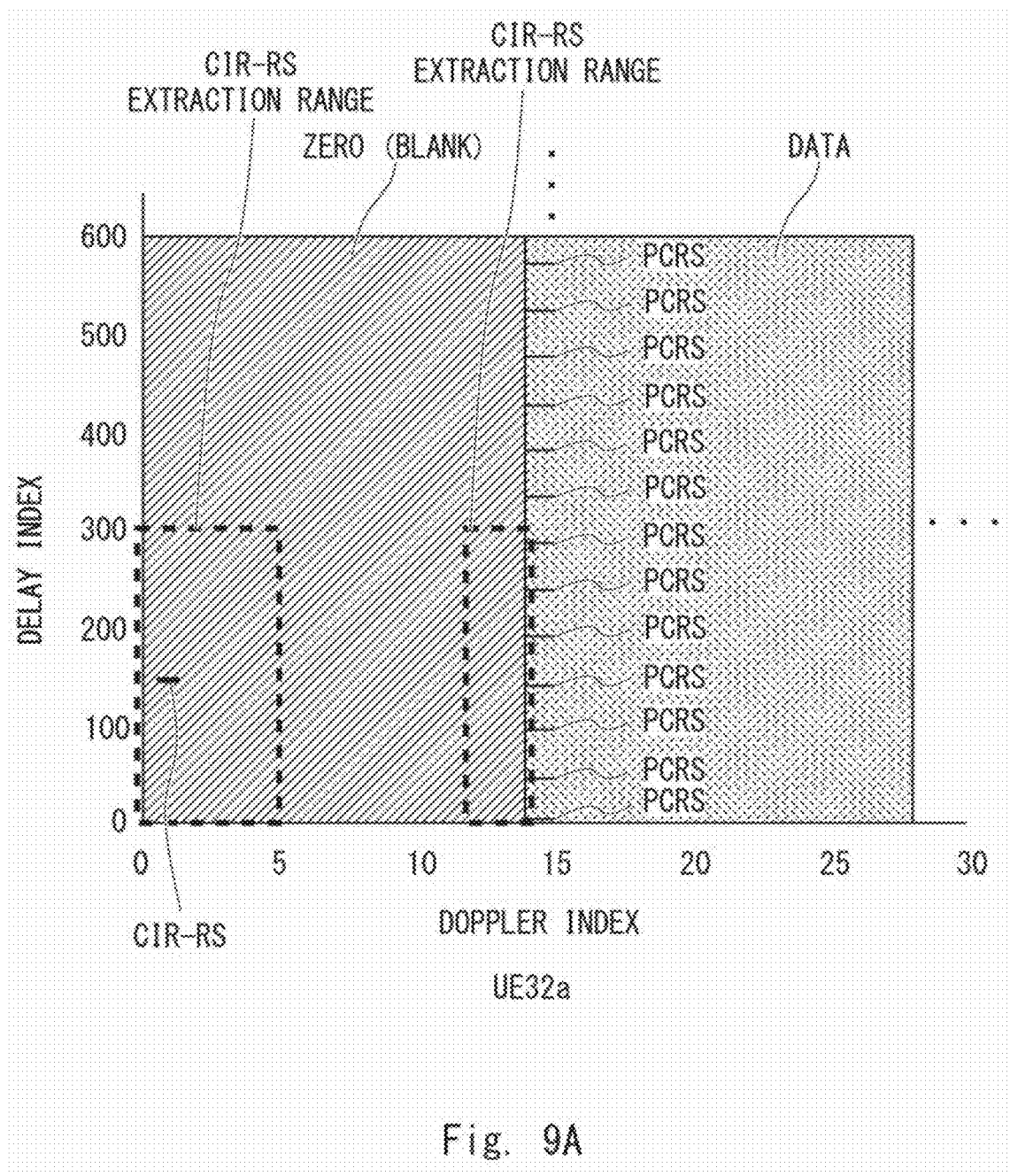
FIG. 9A is a schematic diagram illustrating signal mapping when two users are multiply connected.
Figure 9B:
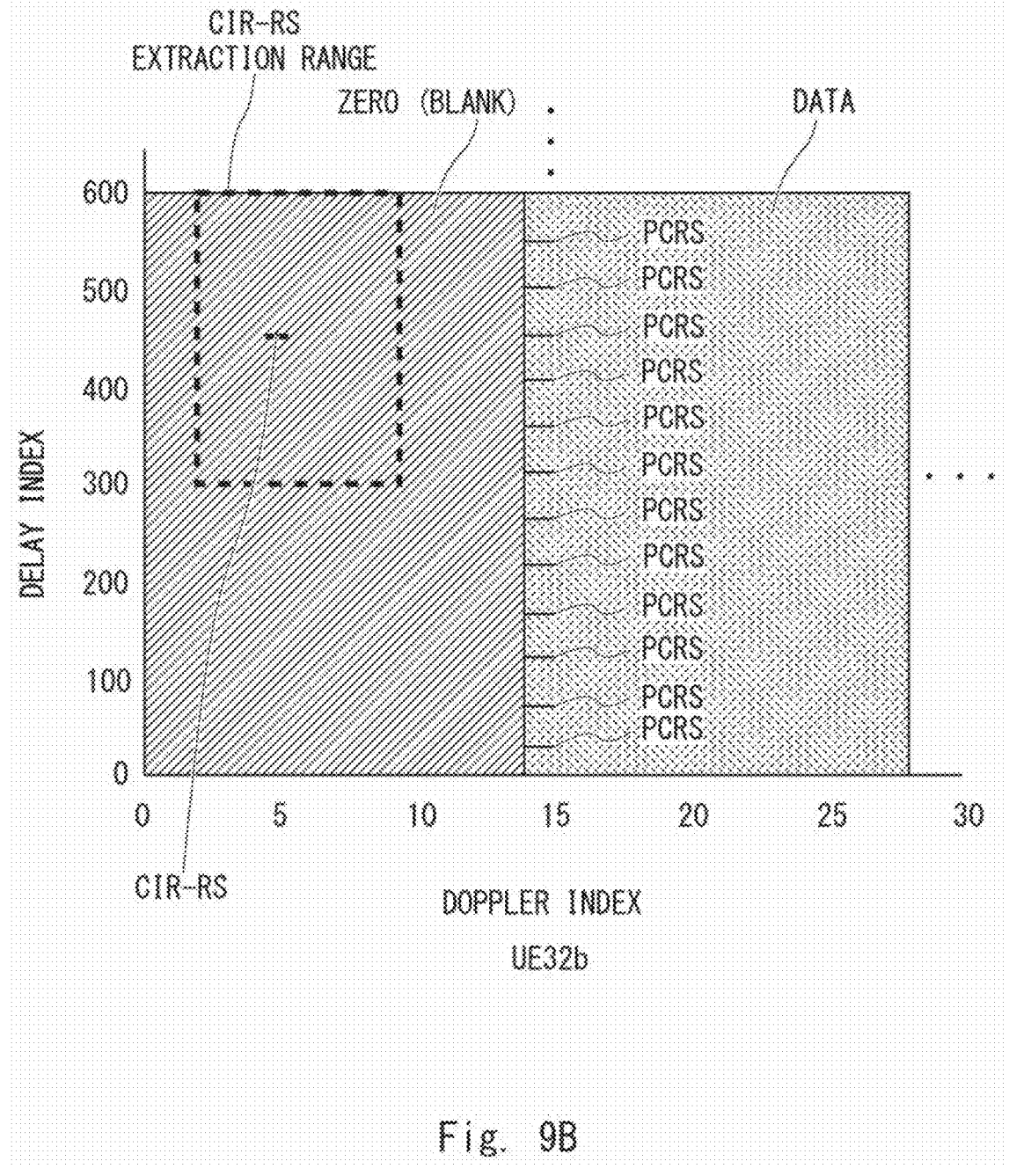
FIG. 9B is a schematic diagram illustrating signal mapping when two users are multiply connected.

FIGS. 9A and 9B are schematic diagrams illustrating signal mapping when two users are multiply connected.

FIG. 9A shows a signal mapping of a first UE (UE 32*a*).

FIG. 9B shows a signal mapping of a second UE (UE 32*b*).

A third example embodiment can also be used in a multi-user environment in which a plurality of UEs 32 and a base station 31 simultaneously communicate with each other. In the third example embodiment, the CIR-RS and the PCRS are arranged by changing the element position for each UE 32.

As illustrated in FIGS. 9A and 9B, in the CIR-RS, a change in an element position on mapping or a change such as diffusion (dispersion) into a plurality of elements appears due to a delay caused by radio wave propagation or the Doppler effect. As a result, when the CIR-RS affects the CIR-RS extraction range of another UE, the CIR estimation accuracy lowers and the demodulation accuracy lowers. Therefore, in the third example embodiment, as illustrated in FIGS. 9A and 9B, the plurality of CIR-RS extraction ranges are arranged at positions sufficiently separated from each other so as not to affect each other.

Specifically, the CIR-RS (first reference signal) for the first UE is disposed within a predetermined first element range for the first UE. The CIR-RS (first reference signal) for the second UE is arranged within a predetermined second element range for the second UE. The first element range and the second element range are arranged at positions separated by greater than or equal to a predetermined distance. Note that the CIR-RS extraction range may be referred to as an element range.

In the third example embodiment, the CIR-RS extraction unit can extract only the CIR-RS of each UE, and can reliably obtain the CIR of each UE by arranging the CIR-RS for the UE 32*a* and the CIR-RS for the UE 32*b* at distant positions.

Furthermore, the PCRS may be arranged such that the element positions do not overlap for each UE.

In the first to third example embodiments, since the channel correction using the CIR is performed in the FT space, a spatial multiplexing technique such as a zero-forcing method or a minimum mean square error method can be used. As a result, since a plurality of signals can be multiplexed simultaneously and in the same frequency band, the communication amount can be increased.

Note that the increase in the communication amount by the spatial multiplexing technique can be applied not only to the upstream signal but also to the downstream signal using the reversibility of the propagation channel. As a result, the communication amount can be increased even in the downstream.

In the above example embodiment, the present invention has been described as a hardware configuration, but the present invention is not limited thereto. The present invention can also realize the processes of each component by causing a central processing unit (CPU) to execute a computer program.

Furthermore, in the above-described example embodiment, the program can be stored using various types of non-transitory computer-readable medium and supplied to the computer. The non-transitory computer-readable media include various types of tangible storage medium. Examples of the non-transitory computer-readable media include a magnetic recording medium (specifically, a flexible disk, a magnetic tape, or a hard disk drive), a magneto-optical recording medium (specifically, a magneto-optical disk), a CD-read only memory (ROM), a CD-R, a CD-R/W, and a semiconductor memory (specifically, a mask ROM, a programmable ROM (PROM), an erasable PROM (EPROM), a flash ROM, or a random access memory (RAM). In addition, the program may be supplied to the computer by various types of transitory computer-readable media. Examples of transitory computer-readable media include electrical signals, optical signals, and electromagnetic waves. The transitory computer-readable media can supply the programs to the computer via wired or wireless communication paths such as wires and optical fiber.

Moreover, while operations are shown in a specific order, this should not be understood as requiring that such operations be performed in the specific order shown or in a sequential order, or that all operations shown be executed, to achieve desirable results. In a specific situation, multitasking and parallel processing may be advantageous. Similarly, while details of some specific example embodiments are included in the above discussion, these should be construed as descriptions of features specific to the specific example embodiments, rather than as limitations on the scope of the disclosure. Specific features described in the context of separate example embodiments may be implemented in combination in a single example embodiment. Conversely, various features described in the context of a single example embodiment may be implemented in a plurality of example embodiments separately or in any suitable combination.

Although the invention of the present application has been described above with reference to the example embodiments, the invention of the present application is not limited to the above. Various modifications that can be understood by those skilled in the art can be made to the configuration and details of the invention of the present application within the scope of the invention.

Note that the present invention is not limited to the example embodiments described above and can be appropriately changed without departing from the gist of the present invention.

Some or all of the above-described example embodiments can be described as in the following Supplementary Notes, but are not limited to the following Supplementary Notes.

(Supplementary Note 1)

A wireless communication device including: a reception unit configured to perform channel estimation using a first reference signal, perform phase correction using a second reference signal, and demodulate a received orthogonal time frequency space (OTFS) signal using results of the channel estimation and the phase correction.

(Supplementary Note 2)

The wireless communication device according to supplementary note 1, in which the reception unit receives and demodulates the OTFS signal including a subframe in which the first reference signal is arranged and a subframe in which the second reference signal is arranged.

(Supplementary Note 3)

The wireless communication device according to supplementary note 1 or 2, in which the first reference signal is a channel impulse response-reference signal (CIR-RS) for obtaining a channel impulse response (CIR), and the second reference signal is a phase compensation reference signal (PCRS) for performing the phase correction.

(Supplementary Note 4)

The wireless communication device according to supplementary note 3, in which the reception unit includes:

a first equalizer configured to perform channel correction based on the first reference signal in a frequency time (FT) space; and a second equalizer configured to perform the phase correction processing based on the second reference signal in a Delay Doppler (DD) space.

(Supplementary Note 5)

The wireless communication device according to supplementary note 4, in which the second equalizer performs the process of phase correction after the first equalizer performs the channel correction.

(Supplementary Note 6)

The wireless communication device according to supplementary note 4 or 5, in which the reception unit further includes a channel estimation unit configured to perform the channel estimation using the first reference signal to obtain the CIR, and the first equalizer performs the channel correction on the data received on the basis of the CIR.

(Supplementary Note 7)

The wireless communication device according to supplementary note 6, in which the channel estimation unit calculates, as the CIR, a quotient obtained by dividing the first reference signal obtained from the received OTFS signal by the first reference signal not affected by a propagation channel in the FT space.

(Supplementary Note 8)

The wireless communication device according to supplementary note 6, in which the number of subframes in which only the first reference signal is arranged is one per frame, and the number of subframes in which the data and the second reference signal are arranged may be two or more.

(Supplementary Note 9)

The wireless communication device according to any one of supplementary notes 4 to 7, further including:

a selector configured to perform setting such that a subframe in which only the first reference signal is arranged bypasses the first equalizer, in which in a subframe in which the first reference signal is not arranged, a signal obtained by orthogonal frequency division multiplexing (OFDM) demodulation is input to the first equalizer.

(Supplementary Note 10)

The wireless communication device according to supplementary note 4, further including:

an SFFT conversion unit configured to perform SFFT conversion on a signal on which the channel correction is performed by the first equalizer:

a first reference signal extraction unit configured to extract the first reference signal from a signal converted by the SFFT conversion unit; and an inverse SFFT conversion unit configured to perform inverse SFFT conversion on the signal extracted by the first reference signal extraction unit.

(Supplementary Note 11)

The wireless communication device according to any one of supplementary notes 1 to 10, in which the first reference signal for a first user equipment (UE) is arranged within a predetermined first element range for the first UE, the first reference signal for a second UE is arranged within a predetermined second element range for the second UE, and the first element range and the second element range are arranged at positions separated by greater than or equal to a predetermined distance.

(Supplementary Note 12)

A system comprising a user equipment and a base station, in which the user equipment includes a transmission unit configured to transmit a first reference signal, an orthogonal time frequency space (OTFS) signal, and a second reference signal, and the base station includes a reception unit configured to perform channel estimation using the first reference signal, perform phase correction using the second reference signal, and demodulate the received OTFS signal using results of the channel estimation and the phase correction.

(Supplementary Note 13)

A method including performing channel estimation using a first reference signal, performing phase correction using a second reference signal, and demodulating a received orthogonal time frequency space (OTFS) signal using results of the channel estimation and the phase correction.

(Supplementary Note 14)

A program for causing a computer to execute performing channel estimation using a first reference signal, performing phase correction using a second reference signal, and demodulating a received orthogonal time frequency space (OTFS) signal using results of the channel estimation and the phase correction.

Although the invention of the present application has been described above with reference to the example embodiments, the invention of the present application is not limited to the above. Various modifications that can be understood by those skilled in the art can be made to the configuration and details of the invention of the present application within the scope of the invention.

This application claims priority based on Japanese Patent No. 2021-160872 filed on Sep. 30, 2021, and the entire disclosure thereof is incorporated herein.

REFERENCE SIGNS LIST

10 SYSTEM
11, 21, 31 WIRELESS COMMUNICATION DEVICE, BASE STATION
111 RECEPTION UNIT
1111 OTFS POST-PROCESSING UNIT
1112 OFDM DEMODULATION UNIT
12, 32 UE
32*a* FIRST UE
32*b* SECOND UE
122 TRANSMISSION UNIT
1221 OTFS PRE-PROCESSING UNIT
1222 OFDM MODULATION UNIT
M, N TOTAL INDEX NUMBER
EQ1 FIRST EQUALIZER
EQ2 SECOND EQUALIZER
SE1 FIRST SELECTOR
SE2 SECOND SELECTOR
UE TERMINAL

The invention claimed is:

1. A wireless communication device comprising:
at least one memory storing instructions, and
at least one processor configured to execute the instructions to:
perform channel estimation using a first reference signal, perform phase correction using a second reference signal, and demodulating demodulate a received orthogonal time frequency space (OTFS) signal using results of the channel estimation and the phase correction,
wherein the first reference signal is a channel impulse response-reference signal (CIR-RS) for obtaining a channel impulse response (CIR), and
the second reference signal is a phase compensation reference signal (PCRS) for performing the phase correction, and
wherein the wireless communication device further includes:
a first equalizer configured to perform channel correction based on the first reference signal in a frequency time (FT) space; and
a second equalizer configured to perform the phase correction processing based on the second reference signal in a Delay Doppler (DD) space.

2. The wireless communication device according to claim 1, wherein
the at least one processor configured to execute the instructions to receive and demodulate the OTFS signal including a subframe in which the first reference signal is arranged and a subframe in which the second reference signal is arranged.

3. The wireless communication device according to claim 1, wherein
the second equalizer performs the process of phase correction after the first equalizer performs the channel correction.

4. The wireless communication device according to claim 1, wherein
at least one processor configured to execute the instructions to perform a channel estimation using the first reference signal to obtain the CIR, and
the first equalizer performs the channel correction on the data received on the basis of the CIR.

5. The wireless communication device according to claim 4, wherein
the at least one processor configured to execute the instructions to calculate, as the CIR, a quotient obtained by dividing the first reference signal obtained from the received OTFS signal by the first reference signal not affected by a propagation channel in the FT space.

6. The wireless communication device according to claim 4, wherein
the number of subframes in which only the first reference signal is arranged is one per frame, and
the number of subframes in which the data and the second reference signal are arranged may be two or more.

7. The wireless communication device according to claim 1, further comprising:
a selector configured to perform setting such that a subframe in which only the first reference signal is arranged bypasses the first equalizer, wherein
in a subframe in which the first reference signal is not arranged, a signal obtained by orthogonal frequency division multiplexing (OFDM) demodulation is input to the first equalizer.

8. The wireless communication device according to claim 1, the at least one processor configured to further execute the instructions to:
perform SFFT conversion on a signal on which the channel correction is performed by the first equalizer;
extract the first reference signal from a signal converted by the SFFT conversion means; at least one processor; and
perform inverse SFFT conversion on the signal extracted by the at least one processor.

9. The wireless communication device according to claim 1, wherein
the first reference signal for a first user equipment (UE) is arranged within a predetermined first element range for the first UE,
the first reference signal for a second UE is arranged within a predetermined second element range for the second UE, and
the first element range and the second element range are arranged at positions separated by greater than or equal to a predetermined distance.

10. A system comprising:
a user equipment and a base station, wherein the user equipment includes
at least one memory for the user equipment storing instructions, and
at least one processor for the user equipment configured to execute the instructions to:
transmit a first reference signal, an orthogonal time frequency space (OTFS) signal, and a second reference signal, and
the base station includes
at least one memory for the base station storing instructions, and
at least one processor for the base station configured to execute the instructions
perform channel estimation using the first reference signal, perform phase correction using the second reference signal, and demodulate the received OTFS signal using results of the channel estimation and the phase correction, wherein the first reference signal is a channel impulse response-reference signal (CIR-RS) for obtaining a channel impulse response (CIR), and the second reference signal is a phase compensation reference signal (PCRS) for performing the phase correction, and wherein the system further includes:

a first equalizer configured to perform channel correction based on the first reference signal in a frequency time (FT) space; and a second equalizer configured to perform the phase correction processing based on the second reference signal in a Delay Doppler (DD) space.

11. A method comprising performing channel estimation using a first reference signal, performing phase correction using a second reference signal, and demodulating a received orthogonal time frequency space (OTFS) signal using results of the channel estimation and the phase correction, wherein the first reference signal is a channel impulse response-reference signal (CIR-RS) for obtaining a channel impulse response (CIR), and the second reference signal is a phase compensation reference signal (PCRS) for performing the phase correction, and wherein the wireless method further comprises:

performing channel correction based on the first reference signal in a frequency time (FT) space; and performing the phase correction processing based on the second reference signal in a Delay Doppler (DD) space.

* * * * *